United States Patent
Yang

Patent Number: 5,982,116
Date of Patent: Nov. 9, 1999

[54] CONTROLLABLE COMBINED POWER SYSTEM USING AN ACTIVE POWER SOURCE ROTATION SPEED AS THE PROPORTIONAL CONTROL REFERENCE

[76] Inventor: Tai-Her Yang, No. 32 Lane 29, Taipin St., Si-Hu Town, Dzan-Hwa, Taiwan

[21] Appl. No.: 08/949,007

[22] Filed: Oct. 10, 1997

Related U.S. Application Data

[63] Continuation of application No. 08/442,094, May 16, 1995, abandoned.

[51] Int. Cl.$^6$ ........................................................ H02P 5/46
[52] U.S. Cl. ................................................................ 318/77
[58] Field of Search ................................ 318/66, 67, 68, 318/77, 78; 322/47

[56] References Cited

U.S. PATENT DOCUMENTS

| | | | |
|---|---|---|---|
| 3,949,281 | 4/1976 | Young, Jr. .................................. | 318/77 |
| 4,310,791 | 1/1982 | Akamatsu ................................ | 318/812 |
| 4,656,413 | 4/1987 | Bourbeau ................................. | 307/87 |
| 4,841,216 | 6/1989 | Okada et al. ............................. | 322/10 |
| 5,004,962 | 4/1991 | Fonss et al. .............................. | 318/77 |
| 5,239,247 | 8/1993 | Habig et al. ............................. | 318/77 |
| 5,283,506 | 2/1994 | Hoffmann et al. ....................... | 318/77 |
| 5,345,154 | 9/1994 | King ........................................ | 318/49 |
| 5,564,998 | 10/1996 | Fellows .................................. | 475/216 |

Primary Examiner—Robert E. Nappi
Assistant Examiner—Rina I. Duda
Attorney, Agent, or Firm—Bacon & Thomas

[57] ABSTRACT

A controllable combined power system including an active power source and an auxiliary power source uses the active power source as a basis for controlling the speed or torque of the auxiliary power source, either in the same direction as the active power source or in a reverse direction to provide damping.

10 Claims, 3 Drawing Sheets

CONTROLLABLE COMBINED POWER SYSTEM USING AN ACTIVE POWER SOURCE ROTATION SPEED AS THE PROPORTIONAL CONTROL REFERENCE

This application is a Continuation of application Ser. No. 08/442,094, filed May 16, 1995 now abandoned.

SUMMARY OF THE INVENTION

An innovative design for a controllable combined power system made up of an active power system and an auxiliary power source, in which the active power source rotation speed is used as the proportional control reference, is characterized in that the auxiliary power source is controlled to provide proportional auxiliary speed driving, or proportional auxiliary torque driving, or reverse damping, by using the active power source rotation speed as the control reference, so that the interactive relations between the active power source and the auxiliary power source include the following:

1) The auxiliary power source provides additional speed response driving power by using the active power source rotation speed as the reference to commonly drive the load;
2) The auxiliary power source provides additional torque response driving power by using the active power source rotation speed as the reference to commonly drive the load;
3) The auxiliary power source provides reverse damping according to the preset corresponding ratio of the reverse torque by using the active power source rotation speed as the reference;
4) The auxiliary power source possesses the interactive functions 1) to 3) simultaneously or the interactive functions 2) and 3) respectively.

By using the active power source rotation speed as the reference to control the auxiliary power source to provide speed addition or added torque in the same direction according to the preset corresponding auxiliary driving ratio, the auxiliary driving being applicable to unidirectional or bi-directional positive or reverse rotation, the auxiliary driving speed ratio or torque ratio between the active power source and the auxiliary power source can be further linearly or non-linearly controlled by the set ratio or randomly controlled by the input device. For the function of reverse damping, the auxiliary power source provides the reverse torque for damping according to the rotation speed and direction of the active power source.

DETAILED DESCRIPTION OF THE INVENTION

Figure 1:
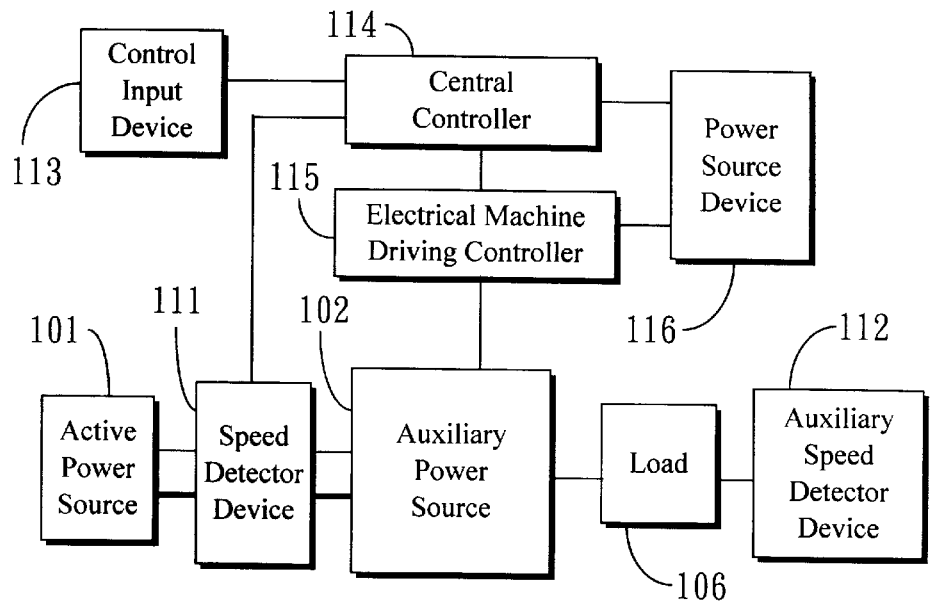
FIG. 1 is a schematic block diagram of the invention.

The principle and the various applications as well as the functions of the controllable combined power system using the active power source rotation speed as the proportional control reference are as follows:

FIG. 1 is a schematic block diagram illustrating the principles of the controllable combined power system of the invention, which uses the active power source rotation speed as the proportional control reference. The combined power system shown in FIG. 1 includes the following:

An active power source 101, which may be driven manually, by electric power, or by other mechanical power and which is capable of performing rotational movements, the power output shaft being directly coupled or power coupled through unidirectional devices with the auxiliary power source or the load;

An active power source speed detector device 111, in the form of an analog or digital speed detector device employed for detecting the rotation speed and direction of the active power source and which is to be used as the auxiliary power control reference;

An auxiliary speed detector device 112, in the form of an analog or digital speed detector device installed for detecting the rotation speed of the auxiliary power source or the output shaft to provide input to the central controller 114 and form a feedback loop (this detector can be omitted if the combined power system is an open system);

A control input device 113 made up of mechanical or solid state electronic components as well as relative control mechanism interfaces, and which can be operated manually to generate digital or analog electrical energy signals, or to receive other electrical energy signals from other electrical energy interfaces for transferring to the central controller 114, to select system functions and set or randomly control the parameters of the auxiliary driving ratio or damping ratio for transferring to the central controller 114, in order to control the ratios of the auxiliary driving speed, auxiliary driving torque, or reverse damping of the auxiliary power source;

A central controller 114 made up of a digital or analog electronic circuit device including electromechanical or solid state electronic components or microprocessors, and which is responsive to the speed detecting device 111 of the active power source 101 and present commands or random commands from the control input device to control the rotation speed or direction of electrical machine driving controller 115 (described below), or the torque of the auxiliary power source 102, or for functioning as a generator to provide kinetic energy through power regeneration, as well as to further control peripheral operating devices such as clutches, the above described system thereby having a linear or nonlinear proportional auxiliary speed or torque driving control, or proportional damping control between the active power source and the auxiliary power source output shaft, according to specific requirements, with the system embodiments being closed cycle, open cycle or semi-open cycle, etc.

An electrical machine driving controller 115 made of electrical machine or solid state electronic components and operated by the central controller 114 and control input device 113 to control the output, output power capacity and the rotation directions of the auxiliary power source;

A power source device 116 for providing the auxiliary power source and the required power supply to the central controller 114, electrical machine driving controller 115, control input device 113, and the peripheral operating devices, and which can be further provided with electric power stored at the auxiliary power source 102 for kinetic energy recovery through power regeneration;

An auxiliary power source 102 coupled to load 106 and which can be an electrically driven motor, made up, for example, of one of the double-acting motors 102A, 102B, 102C, or 102D shown in FIGS. 2–5.

Figure 2:
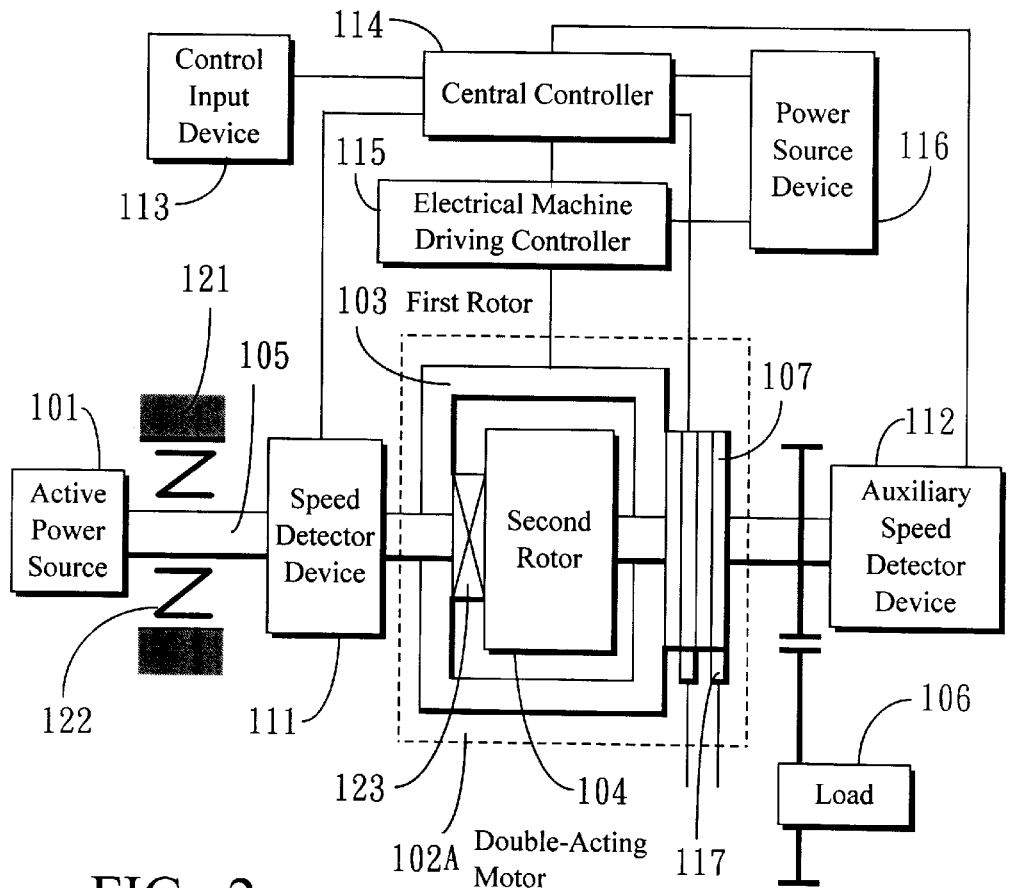
FIG. 2 is a schematic block diagram of the invention illustrating a proportional speed auxiliary driving arrangement constituted by a double-acting motor structure.

The various embodiments and the types of coupling and operation functions of the auxiliary power source and the active power source are as follows:

A) The controllable combined power system using the active power source rotation speed as the proportional control reference may be constituted by double-acting motors as shown in the schematic block diagram of FIG. 2. The auxiliary power source includes a double-acting motor 102A, having a pair of mutually driven rotors including first rotor 103 and a second rotor 104, the structure of which is cylindrical type, disk type, or cone type, and which is part of an electrical machine, the structure and operation modes of which include DC or AC, synchronous or asynchronous, brushed or brushless motor structures and modes. The first rotor 103 is coupled with the active power rotation output shaft 105 directly or through transmission components, and the load 106 is driven by the second rotor 104 directly or through transmission components. First rotor 103 and the second rotor 104 form two units, one unit being a motor field structure while the other unit is a motor rotor structure. Both units or one of the units can be installed with an auxiliary conducting ring 107, conducting brush 117 and brush seat based on the electrical machine types for matching with the double-acting embodiments to transmit power during double-acting driving.

The characteristics of the electrical machine of this embodiment can be selected to include one of the following functions or several of the following functions simultaneously:

1) When the above said structure is used for a proportional speed addition auxiliary power output function, the first rotor 103 is coupled with the active power source, while the second rotor 104 is connected to the load 106;

2) When the above said structure is applied to provide a reversed damping function to counter torque of the active power source, the second rotor 104 is at a stand still without rotation, while the first rotor 103 provides the reversed torque direction contrary to the torque direction of the active power source 101. The reversed torque value can be smaller than the torque value of the active power source 101 and in a reversed direction relative to the active power source;

3) When the above said structure is applied for kinetic energy recovery of loading side inertia or for providing damping to the loading side reaction power, the first rotor 103 is at a stand still, while the second rotor 104 produces a generation function to provide damping.

Figure 3:
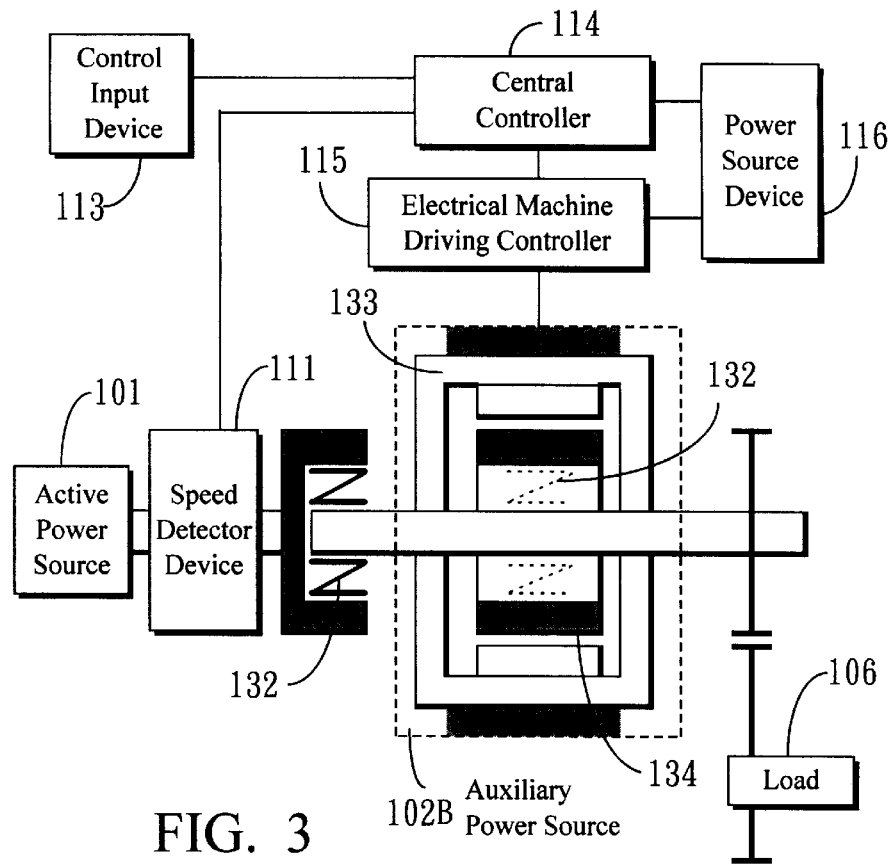
FIG. 3 is a schematic block diagram of the invention illustrating a proportional torque auxiliary driving arrangement constituted by a motor.

B) As shown in FIG. 3, the controllable combined power system using the active power source rotation speed as the proportional control reference can be implemented by installing the motor at a common shaft with the active power source as shown in the schematic block diagram of FIG. 3. The auxiliary power source is constituted by a motor 102B having a fixed shell 133 and a rotor 134 employed to drive the load. The motor types for this embodiment include AC or DC, synchronous or asynchronous, brushed or brushless motors, the functions of which can be selected to include one of he following functions or several of the following functions simultaneously:

1) The rotating shaft of the active power source 101 is connected to the load by sharing the common shaft with the motor through an unidirectional clutch;

2) A speed detector 111 is installed between the rotating shaft of the active power source 101, the driven rotational structure and the static structure for detecting the rotation speed of the active power source 101 being used as the system operating control reference;

3) To provide an auxiliary proportional torque driving function according to the rotation speed of the active power source, the active power source 101 is rotated to drive the speed detector 111, the rotation speed signal is sent to the central controller 114, and when the rotation speed signal reaches above a setting value, the electrical machine driven controller 115 starts to activate the motor to generate the auxiliary torque driving at the same rotational speed as the rotating shaft. The auxiliary torque driving is then operated according to the setting ratio on the central controller 114, or is operated through randomly controlling the auxiliary power source 102B by the control input device 113, the central controller 114 and the electrical machine driving controller 115, to determine the auxiliary torque driving capacity;

4) When the load driving speed obtained by combining the auxiliary driving torques of the auxiliary power source 102B and the active power source 101 is always smaller than the active driving speed of the active power source 101, through the control by the input device 113, the load driving speed can be made greater than the active driving speed of the active power source 101 (which includes the conditions when the active driving speed is zero or a no-load reverse rotation value);

5) For a corresponding reverse damping function according to the rotation speed of the active power source 101, control of the motor to provide reverse damping with the active power source speed as a control reference is the same as the aforesaid process for the auxiliary torque driving, except that the direction of torque is contrary to that of the active power source 100, to provide damping, the negative torque being generated according to the setting ratio on the central controller 114 to provide the damping operation, or the auxiliary power source can be randomly operated by the control input device 113, central controller 114 and electrical driving controller 115 to determine the negative torque value of the auxiliary power source;

6) When the maximum value of the controllable negative torque damping of the auxiliary power source 102B is always smaller than the driving torque of the active power source 101 on the auxiliary power source 102B, or when the system is selected for reverse rotation driving operation, and the auxiliary power source 102B is reverse driven to let the active power source 101 become the reverse driven load, the torque of the auxiliary power source 102B can be made larger or equal to the loading torque of the active power source 101;

7) For kinetic energy recovery, the auxiliary power source 102B is directly converted to a generator to produce mechanical damping.

Figure 4:
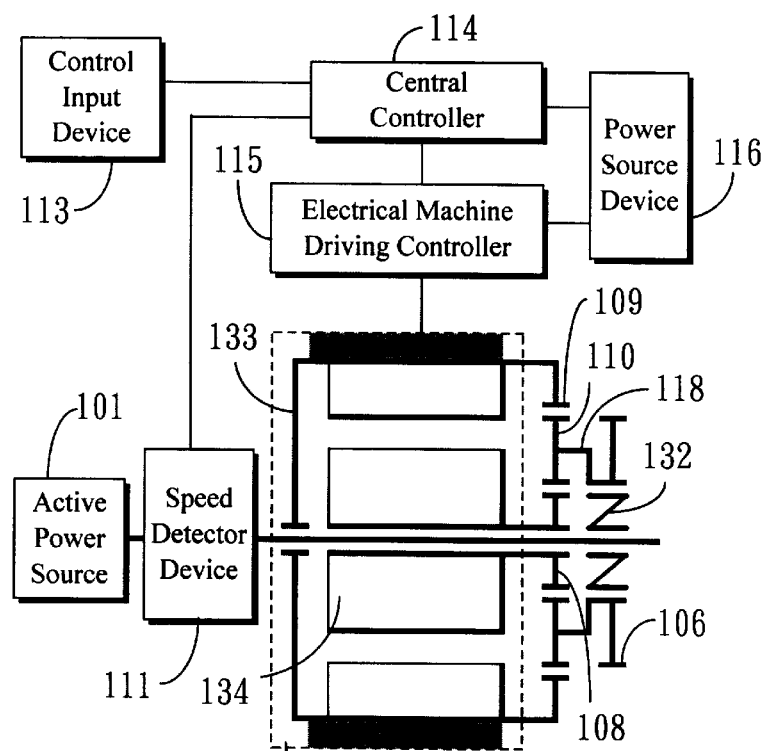
FIG. 4 is a first functional block diagram of an embodiment constituted by a motor and a planetary (or differential) gear train.

C) As shown in FIG. 4, the combined power system using the active power source rotation speed as the proportional control reference may include a motor and a planetary (or differential) gear train, the auxiliary power source being constituted by motor 102C having a fixed motor stator shell 133 and a rotor 134 employed to drive the load. The electrical machine types can include AC or DC, synchronous or asynchronous, brushed or brushless motors, the functions of which can be selected to include one of the following functions or several of the following functions simultaneously:

1) The rotation shaft of the active power source 101 is installed on the same axis as the motor 102C, is connected to the load 106 through a unidirectional clutch 132, and is coupled with an output swing arm 118 driven by the planetary wheel 110 of the planetary differential gear train. The rotation shaft of the motor rotor 134 is coupled through a solar gear 108 with the outer ring gear 109 of the motor stator shell 133 and through the planetary differential gear train for connection to the load 106;

2) A speed detector device 111 is installed between the rotation shaft of the active power source 101, its driven rotational structure and the static structure for detecting the rotation speed of the active power source 101 being used as a control reference for system operation;

3) To provide a proportional torque driving function according to the rotation speed of the active power source, the active power source 101 is rotated to drive the speed detector device 111 and provide an active power source rotation speed signal to the central controller 114. When the rotation speed signal exceeds a set value, the motor is driven by the motor driving controller device 115 to drive the motor to generate an auxiliary torque in the same rotation direction as that of the active power source, and the auxiliary power source 102B is controlled by the driving torque set ratio of the central controller 114, or is randomly controlled by the control input device 113, central controller 114 and the motor driving controller device 115;

4) When the load driving speed obtained by combining the auxiliary driving torque of the auxiliary power source 102C and the active power source 101 is always smaller than the active driving speed of the active power source 101, through the control by the input device 113, the load driving speed can be made greater than the active driving speed of the active power source 101 (which includes the conditions when the active driving speed is zero or a no-load reverse rotation value);

5) The corresponding reverse damping function according to the rotation speed of the active power source 101 can be obtained by controlling the motor to provide reverse damping with the active power source speed as a control reference is the same as the aforesaid process for the auxiliary torque driving except that the direction of torque is contrary to that of the active power source 100 so as to constitute the damping. The negative torque is generated according to the setting ratio on the central controller 114 to provide damping operation, or the auxiliary power source can be randomly operated by the control input device 113, central controller 114 and electrical driving controller 115 to determine the negative torque value of the auxiliary power source;

6) When the maximum value of the controllable negative torque damping of the auxiliary power source 102C is always smaller than the driving torque of the active power source 101 on the auxiliary power source 102C, or when the system is selected for reverse rotation driving operation, and the auxiliary power source 102C is reverse driven to let the active power source 101 become the reverse driven load, the torque of the auxiliary power source 102C is always larger or equal to the loading torque of the active power source 101;

7) To provide kinetic energy recovery, the auxiliary power source 102C is directly converted to provide a generator function and produce mechanical damping.

Figure 5:
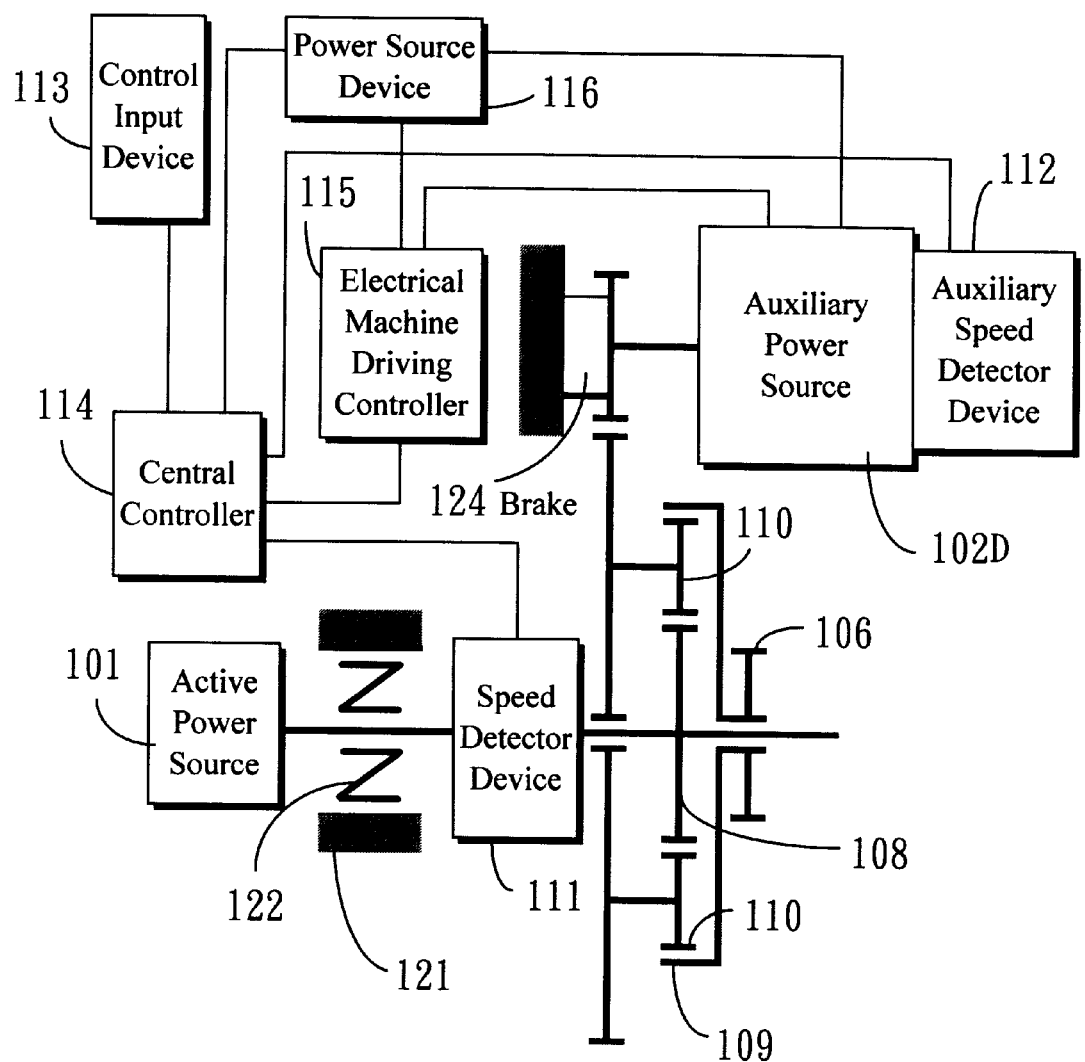
FIG. 5 is a second functional block diagram of the embodiment constituted by a motor and a planetary (or differential) gear train.

D) As shown in FIG. 5, the controllable combined power system using the active power source rotation speed as the proportional control reference may include a motor and a planetary (or differential) gear train. The auxiliary power source is made up of motor 102D, which is coupled with the active power source through the planetary (or differential) gear train. The electrical machine types include AC or DC, synchronous or asynchronous, brushed or brushless motors, the characteristics of which can be selected to provide the following functions:

To provide a proportional speed addition auxiliary driving function, the driving shafts of the active power source 101, auxiliary power source 102D and load 106 are selected according to the corresponding speed ratio and desired functions to respectively couple with the sun gear 108, planetary gear 110 and outer gear 109, the relationship between the active power source 101 and the auxiliary power source 102D being based on the rotation speed of the active power source to control the auxiliary power source, the two power sources providing the proportional speed addition auxiliary driving function through the planetary (or differential) gear train.

The application range of the above said controllable combined power system using the active power source rotation speed as the control reference can be further expanded by additionally installing peripheral operating devices which include the following:

A unidirectional clutch 122 can be series installed between the power output shaft 105 of the active power source 101 and the load 106 for limiting power transmission to unidirectional power transmission; or A unidirectional clutch 122 can be further installed between the output shaft 105 of the active power source 101 and the static shell 121, so that when the load is driven by the auxiliary power source at its set rotation direction, the active power source is in a stand still state; or The above said clutch 122 may be replaced by a clutch operated by manpower, mechanical power, fluid power or electromagnetic power so that when the clutch is released, the active power source and the auxiliary power source are caused by the system to perform speed or torque addition between the two sources for corresponding proportional auxiliary driving, or the auxiliary power source is caused to provide a reverse damping function relative to the active power source, and when the clutch is closed, the active power source is locked while the auxiliary power source is operated for positive or reverse rotation or for kinetic energy recovery; or When the auxiliary power source 102A is a double-acting structure, a clutch 123 operated by manpower, mechanical power, fluid power or electromagnetic power can be further installed between the two power sources, so that the double-acting structure is in an interlocked state when the clutch 123 is closed while the load is directly driven by the active power source;

When the auxiliary power source is as shown in FIGS. 3 or 4, besides combining the motor rotor 134 of the auxiliary power source and the output shaft to load, a unidirectional clutch 132 can be further installed to match with the interaction needs between the sources and the load. The location of installation and the kinetic energy transmission directivity of the unidirectional clutch 132 is as follows:

If the active power source is connected to the load directly or through transmission components, then the unidirectional clutch 132 is installed between the motor rotor 134 of the auxiliary power source and any rotational component which is rotationally driven between the said active power source and the load, so that the working rotation direction of the unidirectional clutch 132 can be selected according to system requirements. If the motor rotor 134 of the auxiliary power source is connected to the load directly or through transmission components, then the unidirectional clutch 132 is installed between the motor rotor 134 of the auxiliary power source and any rotational component which is rotationally driven between the active power source and the load so that the working rotation direction of the unidirectional clutch 132 can be selected according to system requirements;

When the auxiliary power source is constituted by a motor 102D through a planetary (or differential) gear train to couple with the active power source, a brake 124 can be further installed on the rotation shaft of the auxiliary power source 102D to lock the auxiliary power source and its transmission components while allowing the active power source to drive the load directly, or to lock the active power source when providing kinetic energy recovery while allowing the auxiliary power source to be reverse driven for a generation braking function.

In practical application, the clutch and control system can be selected to have both or one of the following functions:

The auxiliary power source is controlled based on the rotation speed of the active power source to be driven in a corresponding auxiliary proportional rotation speed addition driving as well as providing auxiliary torque driving with the active power source in the same direction;

The auxiliary power source is controlled based on the rotation speed of the active power source to provide damping through reversed torque with the active power source, in addition to providing several or one of the above functions so as to be further capable of operating the auxiliary power source driven in positive or reversed rotation or of providing auxiliary functions such as kinetic energy recovery through power regeneration or any part of the above said auxiliary functions.

As summarized from the above descriptions, the controllable combined power system of the invention provides proportional control based on the rotation speed of the active power source using the active power source rotation speed as a reference to correspondingly control the linear or nonlinear auxiliary driving rotation speed or torque ratios between the active power source and the auxiliary power source, or the auxiliary power source is operated with reversed torque to provide damping to the active power source, so that the system can be widely applied in auxiliary driving for operating mechanisms, electric driving carriers, controllable damping devices, etc.

I claim:

1. A combined power system, comprising:
an active power source;
an auxiliary power source coupled to the active power source;
speed detection means for detecting a speed of the active power source;
proportional control means connected to said auxiliary power source and said speed detection means for controlling a ratio between a speed or torque of the auxiliary power source and the speed of the active power source; and
a unidirectional clutch installed between a power output shaft of the active power source and a load to drive the load in a single direction.

2. A combined power system as claimed in claim 1, wherein the proportional control means includes means for detecting a speed of the auxiliary power source to provide an input to an auxiliary power source feedback circuit in order to more precisely control a speed of the auxiliary power source based on the speed of the active power source.

3. A combined power system as claimed in claim 1, wherein the proportional control means includes means for setting a ratio by which a speed or torque of the auxiliary power source relative to the speed of the active power source to provide said proportional control, and for controlling a direction of the auxiliary power source to provide the options of added speed or torque, and reverse damping.

4. A combined power system as claimed in claim 1, wherein the auxiliary power source includes a planetary or differential gear train, a fixed stator, and a rotor arranged to drive a load.

5. A combined power system as claimed in claim 4, wherein the auxiliary power source is coaxial with the active power source and connected to the load through a unidirectional clutch, and the auxiliary power source is coupled with an output swing arm driven by the gear train of the active power source, a rotation shaft of the rotor being coupled with an outer ring wheel of the stator through a sun gear of said gear train.

6. A combined power system as claimed in claim 1, wherein respective proportional speeds of the active and auxiliary power sources are determined by gear ratios of a planetary gear system.

7. A combined power system as claimed in claim 1, wherein said clutch is controllable to permit proportional control of the auxiliary power source based on the speed of the active power source, and also to disengage the active power source to permit separate operation of the auxiliary power source.

8. A combined power system, comprising:
an active power source;
an auxiliary power source coupled to the active power source;
speed detection means for detecting a speed of the active power source;
proportional control means connected to said auxiliary power source and said speed detection means for controlling a ratio between a speed or torque of the auxiliary power source and the speed of the active power source; and
a unidirectional clutch installed between an output shaft of the active power source and a static shell such that when a load is driven by the auxiliary power source in a predetermined direction, the active power source is in a stand still state.

9. A combined power system, comprising:
an active power source;
an auxiliary power source coupled to the active power source;
speed detection means for detecting a speed of the active power source; and proportional control means connected to said auxiliary power source and said speed detection means for controlling a ratio between a speed or torque of the auxiliary power source and the speed of the active power source, wherein the auxiliary power source comprises two rotors connected by a clutch arranged to selectively interlock the rotors.

10. A combined power system, comprising:

an active power source;

an auxiliary power source coupled to the active power source;

speed detection means for detecting a speed of the active power source;

proportional control means connected to said auxiliary power source and said speed detection means for controlling a ratio between a speed or torque of the auxiliary power source and the speed of the active power source; and a clutch mounted between an output shaft of the auxiliary power source and any rotational component situated between the active power source and the load.

\* \* \* \* \*